(12) United States Patent
Steinbichler et al.

(10) Patent No.: US 7,360,410 B2
(45) Date of Patent: Apr. 22, 2008

(54) PROCEDURE AND DEVICE FOR TESTING TIRES

(75) Inventors: Hans Steinbichler, Neubeuern (DE); Robert Wilhelm, Flintsbach (DE); Bernd Leitner, Neubeuern (DE); Roman Berger, Schnaitsee (DE); Volker Rasenberger, Raubling (DE); Rainer Huber, Piding (DE)

(73) Assignee: Steinbichler Optotechnik GmbH, Neubeuern (DE)

( * ) Notice: Subject to any disclaimer, the term of this patent is extended or adjusted under 35 U.S.C. 154(b) by 21 days.

(21) Appl. No.: 10/899,415

(22) Filed: Jul. 26, 2004

(65) Prior Publication Data

US 2005/0109091 A1     May 26, 2005

(30) Foreign Application Priority Data

Jul. 24, 2003   (DE)   ............... 103 33 802

(51) Int. Cl.
*G01M 17/02* (2006.01)
(52) U.S. Cl. ...................... 73/146; 356/602
(58) Field of Classification Search ............... 73/146, 73/146.8; 356/35.5, 602
See application file for complete search history.

(56) References Cited

U.S. PATENT DOCUMENTS

| | | | | |
|---|---|---|---|---|
| 3,918,816 A | * | 11/1975 | Foster et al. ............... 356/602 |
| 4,311,044 A | * | 1/1982 | Marshall et al. ............... 73/146 |
| 4,526,030 A | * | 7/1985 | Vecera, Jr. ............... 73/146.8 |
| 4,631,831 A | * | 12/1986 | Bacher et al. ............... 33/836 |
| 5,245,867 A | * | 9/1993 | Sube et al. ............... 73/146 |
| 5,249,460 A | * | 10/1993 | Dory et al. ............... 73/146 |
| 5,668,731 A | | 9/1997 | Mancosu et al. |
| 5,789,668 A | * | 8/1998 | Coe et al. ............... 73/146 |
| 6,006,599 A | | 12/1999 | Kelm-Klaeger et al. |
| 6,034,676 A | * | 3/2000 | Egan et al. ............... 701/29 |
| 6,502,453 B1 | | 1/2003 | Kelm-Klager |
| 6,840,097 B1 | * | 1/2005 | Huber et al. ............... 73/146 |
| 2004/0212795 A1 | * | 10/2004 | Steinbichler et al. ...... 356/35.5 |

FOREIGN PATENT DOCUMENTS

| | | |
|---|---|---|
| DE | 4232201 | 3/1994 |
| DE | 19911913 | 9/2000 |
| DE | 69516196 | 3/2001 |
| DE | 10036010 | 2/2002 |
| EP | 1043578 | 10/2000 |
| EP | 1099947 | 5/2001 |
| EP | 1284409 | 2/2003 |
| JP | 09251011 A | * 9/1997 |

* cited by examiner

*Primary Examiner*—Andre J. Allen
(74) *Attorney, Agent, or Firm*—Dilworth & Barrese LLP

(57) ABSTRACT

A procedure serves for the testing of tires by means of a testing system. The testing system includes a memory in which geometric data (1, 2, 3, 4, 5, 6) of the tire (7) are stored, and at least one probe (8) for testing the tire (7) surface. To improve on such a device, the probe or probes (8) are positioned with due consideration for the geometric data (1-6) of the tire (7) for the testing of the tire (7) surface (FIG. 1).

38 Claims, 5 Drawing Sheets

Fig. 5
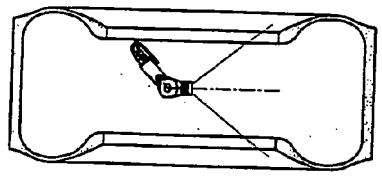
a)
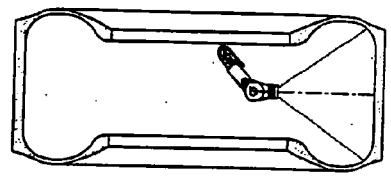
c)
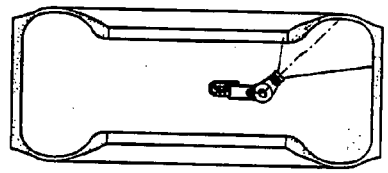
d)
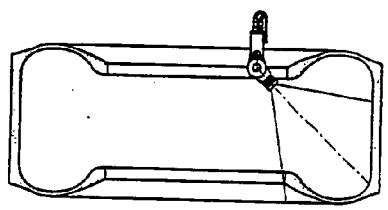
e)
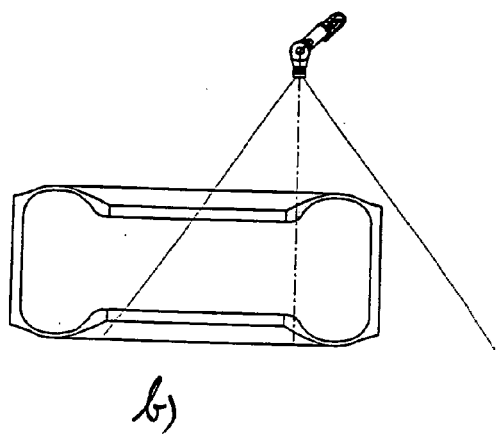
b)
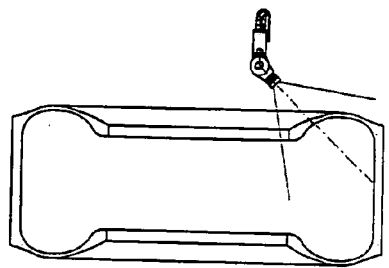
f)

PROCEDURE AND DEVICE FOR TESTING TIRES

BACKGROUND OF THE INVENTION

The invention concerns a procedure for testing tires and a device for performing such procedure.

Tire-testing devices to facilitate testing of tire surfaces for defects are already known. This testing can be done in particular by means of exposure to coherent light, in particular laser light.

SUMMARY OF THE INVENTION

It is the task of the invention to improve a procedure and a device of the type initially identified.

In a procedure of the initially identified type, this task is performed by a tire-testing procedure and system with a memory in which geometric data of the tire are stored, and at least one probe for testing the tire surface. The probe can include a sensor. The probe or probes are positioned, with due consideration for the geometric data of the tire, for testing of the tire surface. When the geometric data of the tire are known, i.e. stored in the memory of the testing system, automatic positioning of the probe or probes for checking the tire surface becomes possible. The tire-testing procedure can thereby be automated.

Advantageous developments of the invention are described herein.

The geometric data of the tire can include the external diameter of the tire and/or the internal diameter of the tire and/or the width of the tire. Preferably, the geometric data of the tire include the external diameter and the internal diameter and the width of the tire.

Instead of or in addition thereto, the geometric data of the tire can include the internal diameter of the tire tread and/or the tire opening and/or the contour of the tire sidewall.

The geometric data of the tire can be input into the memory, particularly manually. Instead of or in addition thereto, the geometric data of the tire can be scanned into the memory, for example from a data bank, particularly via the Internet.

It is advantageous if the geometric data of the tire are measured instead of or in addition thereto. Preferably, the geometric data of the tire are measured automatically or in a self-acting process.

The geometric data of the tire can be measured by a sensor, in particular a path indicator sensor. Triangulation sensors, laser-triangulation sensors, and ultrasound sensors are particularly suitable, as are other sensors or path indicator sensors.

Another advantageous development is characterized by the fact that the sensor can be moved or is moved in relation to the tire.

Preferably, a horizontal profile of the tire is measured. Instead of or in addition thereto, however, a vertical profile of the tire can be measured.

Preferably, the tire surface is tested interferometrically. An interferometric probe can be used for this purpose.

In addition, the tire surface can be tested by means of the projection of structured light.

The tire surface can also be tested by means of photogrammetry.

It is advantageous if the tire surface is tested by the same sensor that measures or has previously measured the geometric data of the tire. The procedure can then be carried out in particularly advantageous manner, particularly by reason of the fact that the same sensor initially measures one or more or all geometric data of the tire and finally checks the tire surface.

The task underlying the invention is performed with a tire-testing device, particularly by performance of the procedure according to the invention, insofar as the device has a testing system that includes memory for storing geometric data of the tire and at least one probe for testing the tire surface. The probe can have a tire-surface testing sensor.

Advantageous developments of the device according to the invention are the subject of the additional sub-claims.

Preferably, the device contains a measuring device for measuring the geometric data of the tire. The measuring device can have a sensor. It is advantageous if the measuring device and/or the sensor can be moved in relation to the tire. Preferably, the measuring device or the sensor is movable in relation to the tire in such manner that a horizontal profile of the tire and/or a vertical profile of the tire can be measured or determined.

The testing system can have an interferometric probe.

Preferably, the sensor in the probe is also the sensor in the measuring device. In this case the tire-testing device has a sensor that serves to measure the geometric data of the tire and to test the tire surface, preferably immediately thereafter.

BRIEF DESCRIPTION OF THE DRAWINGS

Embodiments of the invention are explained below individually by means of the attached drawing, which shows.

DESCRIPTION OF THE PREFERRED EMBODIMENTS

Figure 1:
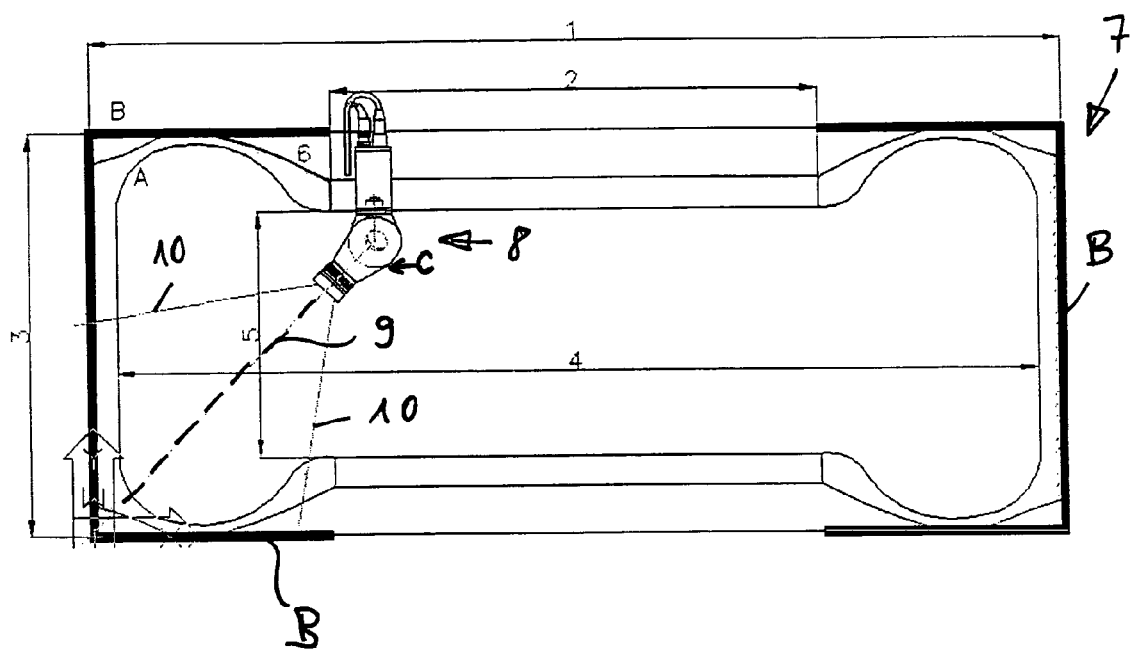
FIG. 1 a cross-section through a tire in a schematic view.

For fully automatic testing and also classification of test objects, specifically, tires, the requirements include knowledge of the geometry of each specimen or tire, to permit optimum positioning of the probe or probes so that all relevant areas can be detected and collisions with the tire can at the same time be prevented.

To ensure this, the tire-testing procedure is carried out by means of a testing system having a memory (not shown in the drawing) in which the geometric data of the tire 7 are stored, and a probe 8 for testing the tire 7 surface. For the testing of the tire 7 surface, the probe 8 is positioned with due consideration for the geometric data of the tire 7.

The geometric data of tire 7 are visible in FIG. 1. The external diameter 1 of the tire, the internal diameter 2 of the tire, and the width 3 of the tire 3 [sic] are stored in the memory.

A model B of tire 7 can thereupon be created, which however is insufficient in most applications.

The probe 8 has a camera C with an optical axis 9 and a visual angle 10. The actual visual field of camera C, that is, that area of tire 7 surface that can be covered (visual field of an individual measurement), with camera C in a specific position and orientation, in the testing of tire 7 surface (visual field of an individual measurement) depends on the position of camera C and visual angle 10. To facilitate determination from the position and the visual angle of camera C of the actual visual field of an individual measurement and the number of measuring positions of the camera needed in order to test the entire surface of the tire, in many applications the internal diameter 4 of the tire tread must also be known. Knowledge of the internal diameter 4 of the tire tread makes it possible to determine the object distance, that is, the distance from the surface of the tire to be tested to camera C.

In many applications, the tire opening 5 is of considerable importance, since it markedly affects the accessibility of the tire surface or tire tread that is to be tested. In many applications the contour 6 of the tire 7 sidewall is of considerable importance, particularly for collision protection, that is, in order to prevent a collision of probe C with tire 7, and for measurement field determination (visual field determination) in the testing of the tire 7 side wall.

The aforementioned geometric data, that is, external diameter 1, internal diameter 2, tire width 3, internal diameter 4 of tread, width of opening 5, and/or sidewall contour 6, can be entered manually and/or scanned, in particular from a data bank and/or with the help of a bar code. However, this is possible only if all the geometric data of the tire are known, something that is not guaranteed in every case.

In general, some or all of the said geometric data must be determined by means of measurement techniques.

Figure 2:
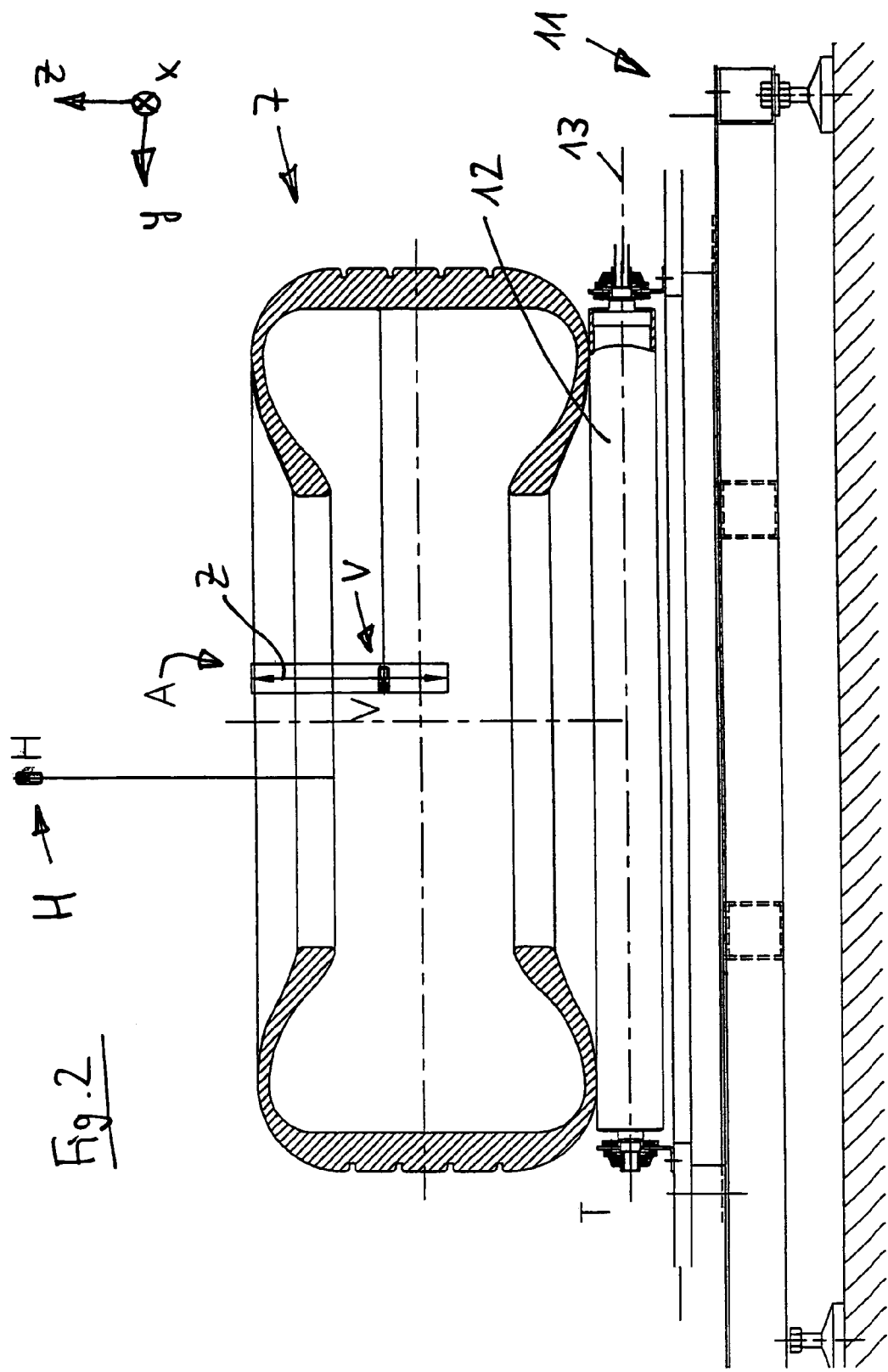
FIG. 2 a tire-testing device, with a tire to be tested, shown in cross-section, FIG. 3 the operating principle of a light-slit sensor in a schematic perspective view, FIG. 4 in top view, a tire to be tested, and FIG. 5 several illustrations of a tire and a probe in various positions, in each case in cross-section.

FIG. 2 shows a tire-testing device, with a tire 7 to be tested shown in cross-section. The device has an underframe 11 with a number of rollers 12 housed to turn on axle 13 running in direction Y, so that the tire 7 lying flat thereon can be moved in horizontal direction X. The device has a vertically-oriented triangulation sensor H and a horizontally-oriented triangulation sensor V. While tire 7 is moved horizontally in direction X, vertically-oriented triangulation sensor H takes a horizontal profile. A second, vertical profile is obtained by movement of horizontally-oriented triangulation sensor V in vertical direction Z by means of a positioning device A. In addition, triangulation sensor H can be designed to move in horizontal direction Y (not illustrated in the drawing). The measurement direction of triangulation sensor H runs vertically counter to direction Z. The measurement direction of triangulation sensor V runs horizontally counter to direction Y. All geometric data 1-6 can be measured by means of triangulation sensors H and V. The device can be designed in such manner that these measurements are taken automatically.

FIG. 2 shows a laser triangulation system. Instead of or in addition thereto, geometric data 1-6 can also be measured by ultrasound sensors or other path-indicator sensors moved with the help of any existing positioning system of the device relative to tire 7.

The tire 7 surface can be tested by means of an interferometric testing device. The testing device can be expanded by any necessary additional hardware, as well as by evaluation algorithms for determining coordinates with the same camera or additional cameras. One possibility for testing the tire 7 surface consists in the projection of structured light onto this surface. Through the projection of, for example, one or more stripes onto the tire surface by means of a projection device (e.g. a projector, a laser diode with line optics, etc.) whose optical axle assumes a known angle in relation to the observation direction, a visual model is created that can be evaluated via triangulation computation in order to determine distance.

Figure 3:
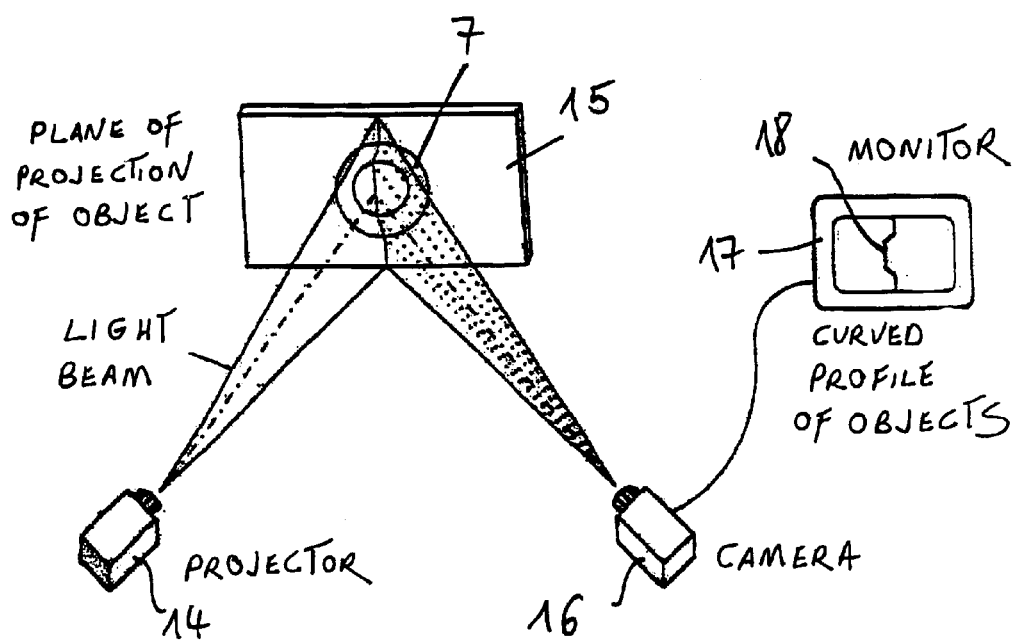

The operating principle of a light-slit sensor is illustrated in FIG. 3. By means of a projector 14, structured light is cast onto projection plane 15, in which tire 7 is located. The light beamed back therefrom is captured by a camera 16 and is shown on a monitor 17. The curved profile 18 of tire 7 can be seen there.

Instead of stripes, any kind of recognizable pattern (for example bars, circles, or discs, possibly in different colors and/or intensities) can be projected. However, the evaluation software for lines is the simplest.

For observation purposes, an additional camera, or the camera of the interferometric testing system, can be used. In the case of a shearing arrangement, two displaced images are shown. This can be prevented by using hardware (for example, with the help of a shutter) to fade out a partial beam, or it can be taken into consideration in the evaluation.

The measurement arrangement illustrated in FIG. 3 can be used both for testing the tire surface and for measuring the geometric data of the tire.

The same applies to another possible measurement procedure, namely, photogrammetry. If tire 7 is observed with two cameras whose optical axes assume a known angle, one and the same point on the tire surface can be identified by means of existing surface features of the tire or by means of photogrammetrically positioned "measurement markers" in the two images. The coordinates of the test specimen can be computed via triangulation computation from the camera positions and the enclosed angle. For observation purposes, two additional cameras, or one additional camera and the camera of the interferometric testing system, can be used. In the case of a shearing arrangement, two displaced images are shown. This can be prevented by using hardware (for example, with the help of a shutter) to fade out a partial beam, or it can be taken into consideration in the evaluation.

Figure 4:
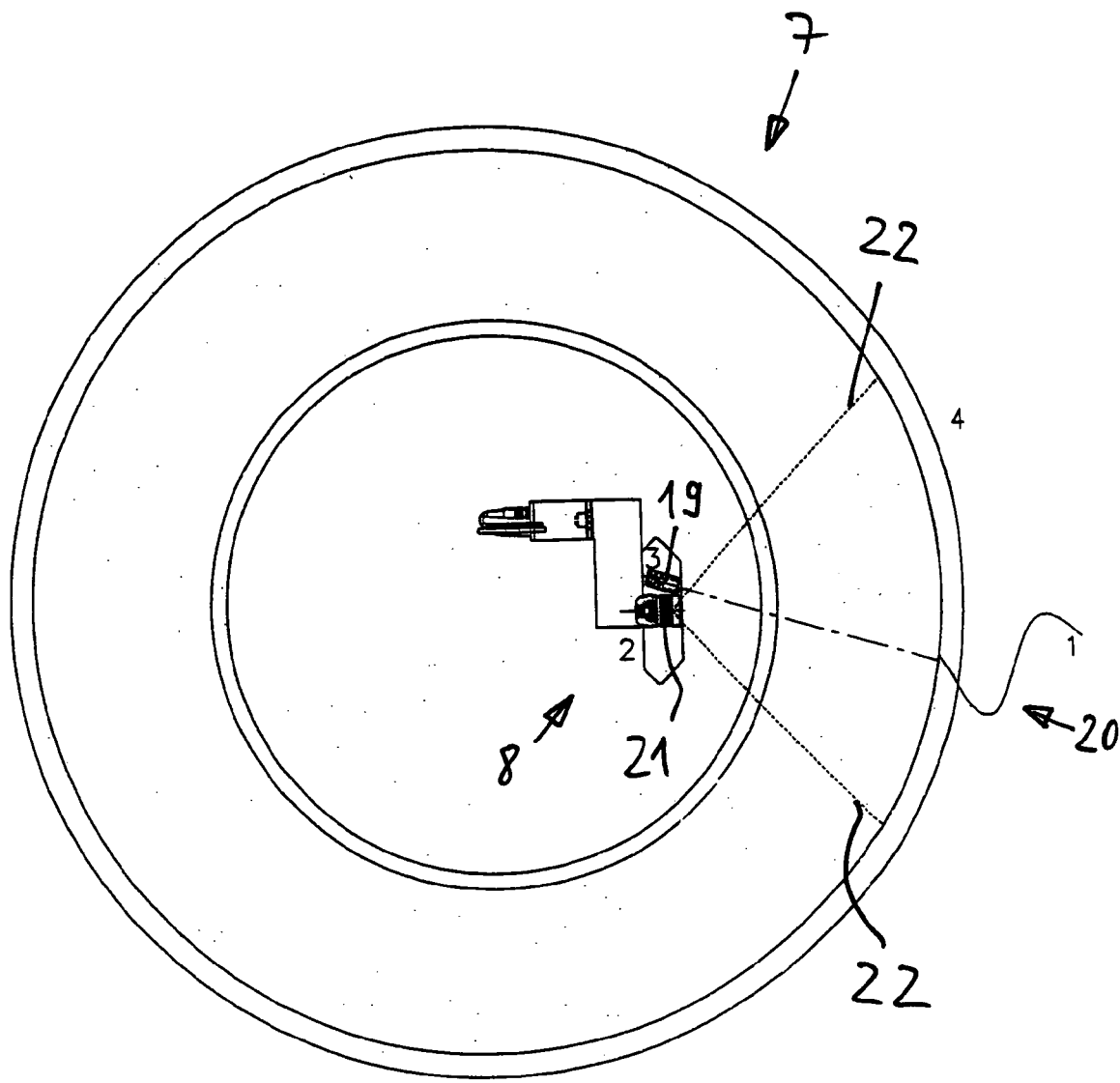

FIG. 4 shows a top view of a tire 7 to be tested. By means of a laser diode 19 with line optics, one or more lines 20 are projected onto the tire 7 surface, which said lines are observed with the shearing camera 21 under a picture angle 22. A spectral section can thereby be faded out in the optics of the shearing camera 21. However, this is not absolutely necessary.

Illumination by means of laser diode 19 and observation by means of the shearing camera 21 enclose an angle that makes it possible to determine the line coordinates by means of triangulation. For this purpose the arrangement is calibrated beforehand, for example with a stepped body.

In contrast to DE 100 09 870 C2, the image segment measured is different from the segment measured in the interferometric test. Instead, probe positions inside or outside the tire are selected, and from them the tested geometric data can be determined.

In FIG. 5, the probe positions for measuring tire 7 are shown on the left side. The positions for interferometric testing of the tire 7 surface are shown on the right side. What is important in the positions is not the overview but rather the high detail resolution. The positions according to FIGS. 5*a* and 5*b* thus also serve for the measurement of the geometric data of the tire; the positions according to FIG. 5*c, d, e,* and *f* serve for testing the tire surface.

By means of the invention, a fully automatic testing device for tires is created. In particular, it is possible initially to measure all necessary geometric data of the tire and subsequently to measure the tire surface. This can be done by means of one and the same sensor or probe.

The invention claimed is:

1. Procedure for testing the surface of tires for defects, comprising the steps of storing geometric data (1, 2, 3, 4, 5, 6) of the tire (7) in a memory of a testing system, positioning at least one probe (8) for testing the tire (7) surface for defects based upon the geometric data (1-6) of the tire (7) stored in the memory of the testing system, testing the tire (7) surface for defects, and maintaining an opening (5) of the tire (7) uncovered and accessible at all times, so that an internal surface of the tire (7) can be tested for defects.

2. Procedure according to claim 1, wherein the geometric data of the tire (7) include the external diameter (1) and/or the internal diameter (2) and/or the width (3).

3. Procedure according to claim 1, wherein the geometric data of the tire (7) include the internal diameter of the tire (7) tread.

4. Procedure according to claim 1, wherein the geometric data of the tire (7) include the width of the tire (7) opening (5).

5. Procedure according to claim 1, wherein the geometric data of the tire (7) include the contour (6) of the tire (7) sidewall.

6. Procedure according to claim 1, comprising the additional step of entering or scanning the geometric data (1-6) of the tire (7) into the memory.

7. Procedure according to claim 1, comprising the additional step of measuring the geometric data (1-6) of the tire (7).

8. Procedure according to claim 7, comprising the additional step of measuring the geometric data (1-6) of the tire with a sensor (H, V, 16, 21).

9. Procedure according to claim 8, comprising the additional step of moving the sensor in relation to the tire.

10. Procedure according to claim 7, comprising the additional step of measuring a horizontal profile of the tire.

11. Procedure according to claim 7, comprising the additional step of measuring a vertical profile of the tire.

12. Procedure according to claim 1, comprising the additional step of testing the tire (7) surface interferometrically.

13. Procedure according to claim 1, comprising the additional step of testing the tire (7) surface by projecting structured light.

14. Procedure according to claim 8, comprising the additional step of testing the tire surface by the sensor used to measure the geometric data of the tire.

15. Tire-testing device, comprising a testing system having a memory structured and arranged for storing geometric data (1-6) of the tire (7) therein, at least one probe (8) structured and arranged to be positioned based upon the stored geometric data (1-6) and for testing the tire (7) surface for defects, and means for maintaining an opening (5) of the tire (7) uncovered and accessible at all times, so that an internal surface of the tire (7) can be tested for defects.

16. Device according to claim 15, additionally comprising a device structured and arranged for measuring the geometric data of the tire.

17. Device according to claim 16, wherein the measuring device has a sensor.

18. Device according to claim 16, wherein the measuring device is moveably mounted in relation to the tire.

19. Device according to claim 15, wherein the testing system has an interferometric probe.

20. Device according to claim 15, wherein the probe sensor is additionally used in the measuring device.

21. A procedure for testing tires by a testing system, comprising the steps of storing geometric data (1,2,3,4,5,6) of the tire (7) in a memory, and positioning at least one probe (8) for testing the tire (7) surface with consideration for the geometric data (1-6) of the tire (7) for the testing of the tire (7) surface, wherein the tire (7) surface is tested by photogrammetry.

22. The procedure for testing tires by a testing system according to claim 1, wherein the at least one probe (8) is positioned within an internal diameter of the tire (7) to scan at least one of an inner radial opening (5), internal radial diameter (4) and internal contour (6) of a sidewall of the tire (7), and the geometric data (1-6) include external radial diameter (1), diameter (2) of the inner radial opening (5), width (3) between external sidewalls, the internal radial diameter (4) and the internal contour (6) of the tire (7) sidewall.

23. A procedure for testing the surface of tires for defects by a testing system according to claim 1, comprising the additional step of arranging two probes (8) for testing the tire (7) surface for defects.

24. A procedure for testing the surface of tires for defects by a testing system according to claim 1, comprising the additional step of positioning at least one probe within the internal diameter of the tire for testing the internal surface of the tire (7).

25. Device according to claim 15, wherein the at least one probe (8) is positioned within an internal diameter of the tire (7) to scan at least one of an inner radial opening (5), internal radial diameter (4) and internal contour (6) of a sidewall of the tire (7), and the geometric data (1-6) stored within the memory include external radial diameter (1), diameter (2) of the inner radial opening (5), width (3) between external sidewalls, the internal radial diameter (4) and the internal contour (6) of the tire (7) sidewall.

26. A tire-testing device, comprising a testing system having a memory structured and arranged for storing geometric data (1-6) of the tire (7) therein, two probes (8) structured and arranged for testing the tire (7) surface; and means for comparing information picked up by said at least one probe (8) with said stored geometric data (1,2,3,4,5,6) for analyzing the tire (7) for defects, wherein at least one probe (8) is positioned within an internal diameter of the tire (7) to scan at least one of an inner radial opening (5), internal radial diameter (4) and internal contour (6) of a sidewall of the tire (7), and the geometric data (1-6) stored within the memory include external radial diameter (1), diameter (2) of the inner radial opening (5), width (3) between external sidewalls, the internal radial diameter (4) and the internal contour (6) of the tire (7) sidewall.

27. A tire-testing device according to claim 15, additionally comprising two probes (8) structured and arranged for testing the tire (7) surface for defects.

28. A tire-testing device, comprising
   a testing system having a memory structured and arranged for storing geometric data (1-6) of the tire (7) therein, and
   at least one probe (8) structured and arranged for testing the tire (7) surface,
   wherein said at least one probe (8) is a camera arranged for testing the tire (7) surface by photogrammetry.

29. Procedure according to claim 8, comprising the step of
   immediately testing the tire (7) surface for defects after measuring the geometric data (1-6) of the tire (7) with the same sensor (H, V, 16, 21).

30. Device according to claim 17, wherein said same sensor is structured and arranged to immediately test the tire (7) surface for defects after measuring the geometric data (1-6) of the tire (7).

31. Procedure according to claim 1, comprising the additional step of
   placing the tire (7) upon a supporting surface (11) underneath the tire (7) with the tire (7) lying flat thereon (11) and an axis of the tire (7) oriented vertically (Z).

32. Procedure according to claim 31, wherein the supporting surface (11) comprises a number of rollers (12) housed to turn on an axle (13), and comprising the additional step of
   moving the tire (7) along the rollers (12) in a horizontal direction (X) by turning said axle (13).

33. Device according to claim 15, additionally comprising
   a supporting surface (11) structured and arranged underneath the tire (7) and to support the tire (7) lying flat thereon (11), with an axis of the tire (7) oriented vertically (Z).

34. Device according to claim 33, wherein the supporting surface (11) comprises a number of rollers (12) housed to turn on an axle (13), such that the tire (7) moves along the rollers (12) in a horizontal direction (X) by turning the axle (13).

35. Procedure for testing the surface of tires for defects, comprising the steps of
   storing geometric data (1, 2, 3, 4, 5, 6) of the tire (7) in a memory of a testing system,
   placing the tire (7) upon a supporting surface (11) underneath the tire (7) with the tire (7) lying flat thereon (11) and an axis of the tire (7) oriented vertically (Z),
   positioning at least one probe (8) for testing the tire (7) surface for defects based upon the geometric data (1-6) of the tire (7) stored in the memory of the testing system, and
   testing the tire (7) surface for defects.

36. Procedure according to claim 35, wherein the supporting surface (11) comprises a number of rollers (12) housed to turn on an axle (13), and comprising the additional step of
   moving the tire (7) along the rollers (12) in a horizontal direction (X) by turning said axle (13).

37. Tire-testing device, comprising
   a testing system having a memory structured and arranged for storing geometric data (1-6) of the tire (7) therein,
   a supporting surface (11) structured and arranged underneath the tire (7) and to support the tire (7) lying flat thereon (11), with an axis of the tire (7) oriented vertically (Z), and
   at least one probe (8) structured and arranged to be positioned based upon the stored geometric data (1-6) and for testing the tire (7) surface for defects.

38. Device according to claim 37, wherein the supporting surface (11) comprises a number of rollers (12) housed to turn on an axle (13), such that the tire (7) moves along the rollers (12) in a horizontal direction (X) by turning the axle (13).

* * * * *